United States Patent [19]

Stepp

[11] 4,289,698
[45] Sep. 15, 1981

[54] SOLVENT STABLE COPPER PHTHALOCYANINE BLUE PIGMENTS

[75] Inventor: James D. Stepp, Point Roberts, Wash.

[73] Assignee: BASF Wyandotte Corporation, Wyandotte, Mich.

[21] Appl. No.: 109,413

[22] Filed: Jan. 3, 1980

[51] Int. Cl.$^3$ .................... C07D 207/00; C09B 47/04
[52] U.S. Cl. .............................. 260/314.5; 106/288 Q
[58] Field of Search .................. 260/314.5; 106/288 Q

[56] References Cited

U.S. PATENT DOCUMENTS

| | | | |
|---|---|---|---|
| 2,586,598 | 2/1952 | Barnhart | 260/314.5 |
| 3,984,433 | 10/1976 | Spietschka | 260/314.5 |
| 4,010,180 | 3/1977 | Schiessler | 260/314.5 |

FOREIGN PATENT DOCUMENTS 838009  2/1939  France ............................... 260/314.5

OTHER PUBLICATIONS

Barrett et al., "Phthalocyanines and Related Compounds, Part XVI, The Halogenation of Phthalocyanines", *J. Chem. Soc.*, (1939), pp. 1820–1828.

*Primary Examiner*—Brian E. Hearn
*Attorney, Agent, or Firm*—Bernhard R. Swick

[57] ABSTRACT

A process for producing stable copper phthalocyanine blue pigment in the alpha form. Copper phthalocyanine blue crystals are ground to produce a powder. The powder is contacted with chlorine and mixed with sulfuric acid. The pigment-sulfuric acid mixture is then mixed with water.

7 Claims, No Drawings

SOLVENT STABLE COPPER PHTHALOCYANINE BLUE PIGMENTS

BACKGROUND OF THE INVENTION

1. Field of the Invention

The present invention relates to a process for preparing copper phthalocyanine blue pigments in the alpha form characterized by high yield, good dispersing properties and high stability in the presence of heat or aromatic solvents.

2. Prior Art

The introduction of phthalocyanine pigments in 1935 set new standards of excellence in the pigment consuming industries. They are characterized by their excellent light fastness, intensity, bleed and chemical resistance, extreme stability, and exceptionally high tinting strength. Phthalocyanine pigments are restricted to the blue and green regions of the spectrum. Because of their excellent color values, working properties and low cost in addition to durability, the phthalocyanine blue and green pigments are used extensively.

Copper phthalocyanine blue exists in at least two crystalline modifications, a red shade alpha form, and the more stable green shade beta form. The red shade alpha form is highly desirable but presents a problem in that it must be stabilized in some manner to avoid crystal growth or conversion in the presence of heat and/or aromatic solvents to the green shade beta modification. Such stabilization has been performed in the prior art by the introduction of small amounts of chlorine into the pigment molecule. This has been accomplished in the prior art by for example reacting 3 moles of phthalic anhydride and one mole of a monochlorophthalic acid derivative, e.g., the anhydride, the acid, the monosodium salt. This process has the disadvantage in that a marked reduction in chemical yield results. In U.S. Pat. No. 3,024,247, crude beta copper phthalocyanine is acid pasted to gived a dry alpha pigment. This pigment is reacted dry with chlorine to give a red shade stabilized copper phthalocyanine. While this is a valuable process the product produced is not as easily dispersible as might be desired and there is room for improvement in its usefulness in plastics or in flushing.

STATEMENT OF RELEVANT PATENTS

To the best of applicant's knowledge, the following patents are the ones most relevant to a determination of patentability.

| U.S. Pat. No. | Inventor | Issue Date | Assignee |
| --- | --- | --- | --- |
| 3,029,249 | Geiger | 4/10/62 | Sandoz Ltd. |
| 3,437,503 | Massam et al | 4/8/69 | ICI |
| 4,018,791 | Spietschka | 4/19/77 | Hoechst |
| 3,717,493 | Griswold | 2/20/73 | du Pont |
| 4,039,346 | Kranz | 8/2/77 | BASF |
| 4,056,534 | Schiessler | 11/1/77 | Hoechst |

SUMMARY OF THE INVENTION

In accordance with the instant invention, a highly stable, easily dispersible copper phthalocyanine blue pigment in the alpha form is produced by a method which achieves a higher yield by a generally simpler process than that of the prior art. More specifically, a copper phthalocyanine blue pigment in the alpha form is produced which is particularly stable toward a number of organic solvents such as xylene which solvents are normally used in the production of lacquers or vanishes. These copper phthalocyanine blue pigments are produced by grinding copper phthalocyanine blue crystals by suitable means such as a steel ball mill to produce a fine powder in the alpha form, contacting the powder with chlorine preferably by exposure to gaseous chlorine, mixing the chlorinated product with sulfuric acid to produce a pigment, and then mixing the resulting product with water followed by heating, filtering, washing the cake neutral and drying. An excellent product is produced which is stable in xylene at 75° C. for 24 hours.

DESCRIPTION OF THE PREFERRED EMBODIMENT

As hereinabove noted, the present invention is directed to an improved copper phthalocyanine blue pigment in the alpha form characterized by a high degree of stability particularly in the presence of solvents such as xylene. The preferred method of producing this product comprises.

(a) acid washing copper phthalocyanine blue of about 95 percent purity or better, (b) grinding the washed copper phthalocyanine blue crystals preferably in a steel ball mill for a period time sufficient to convert it to the alpha state, (c) contacting the milled powder with chlorine gas generally under ambient temperature and pressure, (d) removing excess chlorine by passing dry air through the milled copper phthalocyanine powder, (e) stirring the product from Step (d) into an aqueous sulfuric acid solution and allowing it to stand, (f) pouring the copper phthalocyanine containing sulfuric acid solution into a substantial amount of water, (g) heating the solution from (f), filtering, washing the filter cake with water till neutral and drying.

Copper phthalocyanine blue is a well known dye product that has been produced at least since 1935 and there are many well known processes for producing it. The two processes most generally employed are (1) heating phthalic anhydride, urea, a copper salt and a catalyst with or without a reaction medium such as chloronaphthalene or trichlorobenzene to 180° to 200° C. and (2) heating phthalonitrile and a copper salt with or without a reaction medium or solid diluent. The product that results is generally a copper phthalocyanine blue pigment in the beta form and such products are generally washed by methods well known to those skilled in the art. In general, the washing processes involve boiling the crude copper phthalocyanine blue in 10 percent of an acid preferably HCl or $H_2SO_4$, filtering, and washing with hot water at about 70° C. This results in a product that is about 95 percent pure which is a commercially pure product. Generally, such products will not chlorinate at room temperature.

The washed crude copper phthalocyanine blue is ground for a period long enough to convert it to the alpha state preferably in a ball mill. The ball milling time will depend upon the size of the ball mill used. In general, for a laboratory mill of 2-gallon size the minimum will be about 16 hours. The grinding time in a 1000 gallon production mill would generally be around 8 hours. Grinding times may exceed these by substantial amounts without any detrimental effects. However, obviously for economic reasons it is undesirable to mill for any greater length of time than necessary. A conventional ball mill can be employed such as one of steel which is approximately one half full by volume with, for example, one inch by one inch steel rods or one inch steel balls. The mill should be rotated at about 70 percent of its critical speed (i.e., the speed at which the balls or rods start rotating with the mill). It is necessary that a cascading action take place. In the preparation of copper phthalocyanine blue pigment in the alpha state it is generally preferred to grind the material to from about 0.05 to 0.1 microns. The milling operation is conducted at ambient pressure and while there is some exothermic heating no attempt is made to control the temperature.

The chlorination generally takes place at room temperature and atmospheric pressure. However, the temperature can range from about 25° to 100° C. and the pressure can range from about one atmosphere to four atmospheres. Chlorination is achieved by passing chlorine gas into a container of ground pigment until it appears to be full, after which in a batch operation it is closed up and allowed to stand for about one-quarter to 3 hours. The weight ratio of chlorine to pigment is about 0.03:1 to 0.2:1. Preferably, enough chlorine is employed and the reaction time is sufficient for the pigment to react with from about 3 to 9 percent chlorine by weight of the milled pigment. Generally, only about one-half of the chlorine reacts with the pigment, the balance forming HCl. Excess chlorine is removed by passing dry air through the container.

The chlorinated powder is then added to a container of sulfuric acid. The sulfuric acid employed is preferably an aqueous solution containing about 60 to 90 percent by weight $H_2SO_4$, preferably 70 to 80 percent by weight $H_2SO_4$. The weight ratio of sulfuric acid to chlorinated pitment is about 3:1 to 10:1. The pigment is added to the sulfuric acid with stirring then allowed to stand for from about one-half to 6 hours. After standing, the acid containing the pigment is poured into a container of water wherein the weight ratio of acid to water is about 1:5 to 1:50. The acid-water-pigment mixture is then heated at a temperature from about 50° to 100° C. for a time of from about one-half to 4 hours.

For a more complete understanding of the invention, reference is made to the following illustrative examples thereof. All parts and percentages are by weight and all temperatures are in degrees centigrade unless otherwise indicated.

A standard rub-up referred to in the following examples is performed by mixing 0.5 grams of the pigment in 1.0 grams of an oleoresinous vehicles, and grinding the mixture on an apparatus that comprises a rotating ground glass plate and a stationary ground glass plate. The mixture is ground between these plates held together at constant pressure while the one plate rotates forming an ink. One-tenth gram of the ink is mixed with 7.0 grams of a dispersion of zinc oxide in a viscous oleoresinous vehicle forming a tint. The sample is then compared to a standard sample, which was prepared in an identical manner, by placing thin films of the tints side by side on white paper. This is generally accomplished by placing a small drop of each on the white paper and pulling them down with a drawdown knife.

EXAMPLE 1

900 Grams of crude acid washed beta copper phthalocyanine blue of 95 percent purity were charged to a steel ball mill having a diameter of one foot and a length of 0.458 feet loaded with 18,000 grams of one and one-eighth inch by five-eighth inch cylindrical steel rods. The mill was rotated 48 hours at 60 rpm. X-ray diffraction studies of the product showed that it was predominantly in the alpha phase.

The air in a 2-liter flask was displaced with chlorine until a gain of 3.0 grams was attained. 25 Grams of the product from the steel ball mill produced as described above were then added. An exothermic reaction immediately took place, the temperature rising from 20° C. to 35° C. The flask was shaken periodically for one hour after which the excess chlorine and hydrogen chloride were removed by passing a gentle stream of dry air therethrough.

20 Grams of the chlorinated product were stirred into 100 grams of 70 percent sulfuric acid and allowed to stand one hour. A thick paste was formed which was added to 1500 parts of water, heated to 80°–85° C. for one hour, filtered, washed neutral with water and dried for 24 hours at 75° C. A portion of the product was mixed with xylene and allowed to sit at 75° C. for 24 hours. When this product was compared by a standard rub-up as described above to a commercial non-crystallizing phthalocyanine blue made by the well known chlorophthalic acid process it was slightly superior in strength.

EXAMPLE 2

1000 Grams of crude acid washed beta copper phthalocyanine blue of 95 percent purity was charged to the steel ball mill described in Example 1 and the mill was rotated 16 hours at 60 rpm.

The air in a 2-liter flask was displaced with chlorine until a gain of 3.7 grams was attained. 25 Grams of the milled product were then added to the flask and a reaction similar to Example 1 took place. The flask was shaken periodically for an hour. The product was then added to 500 milliliters of water followed by the addition of dilute caustic soda until a pH of 9 was achieved and the mixture stirred one hour, filtered, washed neutral and dried.

20 Grams of this product were stirred into 75 grams of 80 percent aqueous sulfuric acid and allowed to stand for one hour. The paste was then added to 500 milliliters of water, heated for one hour at a temperature of 75° C., filtered, washed neutral and dried. The product was non-crystallizing when exposed to xylene at 75° C. for 24 hours. When compared by the above rub-up test to a commercial non-crystallizing phthalocycanine blue made by the chlorophthalic acid process, it was superior in strength.

EXAMPLE 3

100 Pounds of crude acid washed beta copper phthalocyanine blue of 95 percent purity were charged to a 120 gallon rod mill loaded with 900 pounds of one inch by one inch cylindrical steel rods. The mill was rotated for 12 hours.

At the conclusion of the milling step, chlorine gas was passed through the mill while rotating for one hour. The mill was equipped with inlet and outlet valves so that ambient pressure was maintained. An exothermic reaction immediately took place, the temperature rising to 45° C. at which time the reaction was complete. Excess chlorine and hydrogen chloride were removed by passing a stream of dry air through the ball mill.

50 Pounds of the chlorinated product were stirred into 200 pounds of 80 percent aqueous sulfuric acid and allowed to stand one hour. A thick paste was formed which was added to 2000 pounds of water, agitated and heated to 75° C. for one hour, filtered, washed neutral with water and dried. The product was comparable to the products of Examples 1 and 2.

Having thus described the invention, what is claimed is:

1. A process for producing stable copper phthalocyanine blue pigment in the alpha form comprising grinding copper phthalocyanine blue crystals to produce a powder, contacting the powder with chlorine and mixing the chlorinated pigment with sulfuric acid.

2. The process of claim 1 wherein the mixture of said pigment and sulfuric acid is mixed with water.

3. The process of claim 2 wherein the weight ratio of chlorine to copper phthalocyanine blue powder is about 0.03:1 to 0.2:1, the chlorination time ranges from about one-fourth to three hours, said sulfuric acid is an aqueous solution of from about 60 to 90 weight percent $H_2SO_4$, the weight ratio of aqueous sulfuric acid to chlorinated pigment is about 3:1 to 10:1 and the weight ratio of sulfuric acid to water in the pigment, sulfuric acid, water mixture is from about 1:5 to 1:50.

4. The process of claim 3 wherein the mixture of copper phthalocyanine pigment and sulfuric acid is allowed to stand for about one-half to 6 hours before mixing with water, and said mixture with water is heated to a temperature of from about 50° and 100° C. for one-half to four hours, the product is filtered washed until neutral and dried.

5. The process of claim 4 wherein said copper phthalocyanine blue is acid washed prior to grinding.

6. The process of claim 4 wherein said grinding is performed in a ball mill.

7. The process of claim 6 wherein said copper phthalocyanine blue is acid washed prior to grinding.

* * * * *